United States Patent [19]

Wirth

[11] 4,316,825

[45] Feb. 23, 1982

[54] HIGH GREEN STRENGTH RUBBERS

[75] Inventor: Kenneth H. Wirth, Baton Rouge, La.

[73] Assignee: Copolymer Rubber & Chemical Corp., Baton Rouge, La.

[21] Appl. No.: 211,123

[22] Filed: Nov. 28, 1980

Related U.S. Application Data

[63] Continuation-in-part of Ser. No. 80,509, Oct. 1, 1979, abandoned.

[51] Int. Cl.$^3$ ............................................. C08L 7/00
[52] U.S. Cl. ................................. 260/5; 260/4 R; 525/211; 525/232; 525/236; 525/240; 525/241
[58] Field of Search ................. 260/4 R, 5; 525/211, 525/232, 240, 241, 236

[56] References Cited

U.S. PATENT DOCUMENTS

| | | | |
|---|---|---|---|
| 3,492,370 | 1/1970 | Wirth | 525/211 |
| 3,492,371 | 1/1970 | Barrett | 525/211 |
| 3,639,323 | 2/1972 | Morrisey | 260/28.5 B |

*Primary Examiner*—J. Ziegler
*Attorney, Agent, or Firm*—McDougall, Hersh & Scott

[57] ABSTRACT

The green strength of SBR, SBR-polybutadiene, natural rubber or combinations thereof is improved by blending with an EPDM or EPM having a high degree of crystallinity.

14 Claims, No Drawings

HIGH GREEN STRENGTH RUBBERS

This is a continuation-in-part of my copending application Ser. No. 80,509, filed Oct. 1, 1979 and entitled "High Green Strength Rubbers", now abandoned.

This invention relates to the preparation of vulcanizable rubbers having good green strength and elongation.

Green strength in a rubber compound is important in a number of applications, such as in the manufacture of radial tires, wherein the rubber component must stretch uniformly without necking or tearing prior to cure. Green strength is a term used to denote the strength, cohesiveness and dimensional stability of rubber compounds before they are cured or vulcanized.

In the manufacture of radial tires, the plies making up the carcass of the tire are laid down in the form of a flat cylinder. The cylinder of built up plies is then blown under high pressure to deform the cylindrical section to the shape of the tire mold with a corresponding substantial increase in diameter. It is important to make use of a rubber compound that stretches uniformly during this increase in diameter and wherein the reinforcing fibers, be they glass fibers, steel fibers, nylon or dacron fibers, spread evenly with the rubber in the tread area during the great increase in diameter. If, instead of stretching uniformly, the rubber breaks or necks, a tire is produced having hidden defects which render it dangerous and unfit for use. This calls for a rubber having good green strength and green elongation so that it will not tear or neck but instead will stretch very much like the rubber after it is cured.

In the manufacture of radial tires, the requirement is for a rubber having green strength wherein little change occurs in the stretching force at the 200-300% modulus, that is, that the stretching force remain substantially the same and preferably increases up to at least 200-300% elongation. This is the measure of rubber having sufficient green strength for use in the build up of radial tires. The problem if of lesser importance in the manufacture of biased tires since the described degree of stretch does not occur in the manufacture of such biased tires.

The industry has refrained from making use of SBR rubber in the carcass of radial tires because of its low green strength. In order to enable use of SBR rubber in the construction of radial tires, the industry has gone in the direction of blending the SBR rubber with natural rubber and/or with other synthetic rubbers such as with polybutadiene rubbers.

It has been found, in accordance with the practice of this invention, that the green strength and elongation of SBR rubber can be greatly improved, without in any way interfering with the other desirable characteristics of SBR rubber styrene-butylene, when the SBR rubber is blended with an EPDM interpolymer having a high degree of crystallinity, such as formed when the mole ratio of ethylene to propylene is greater than 80% and preferably within the range of 82-95 mole percent of ethylene to 18-5 mole percent propylene bound in the EPDM interpolymer. Under such circumstances, the amount of EPDM rubber blended with the SBR can range from 5-50 parts by weight of the EPDM interpolymer to 95-50 parts by weight of SBR, with the amount varying inversely with the degree of crystallinity in the EPDM polymer, i.e. the ratio of EPDM to SBR can be reduced with increased ratio of ethylene to propylene in the EPDM blended with the SBR. It is preferred to make use of a blend of 10-30 parts by weight of EPDM interpolymer per 90-70 parts by weight of SBR, depending somewhat on the mole ratio of ethylene and propylene bound in the EPDM.

The blending of such EPDM interpolymers with SBR gives good green strength to the SBR during forming of radial tires without interfering with the chemistry or cure of the SBR rubber in tire formation.

The EPDM interpolymer blended with the SBR rubber is prepared by interpolymerization of a monomeric mixture of ethylene, at least one monoolefin containing 3-16 carbon atoms, preferably 3-10 carbon atoms, and particularly propylene, and a polyene, preferably 5-alkylidene-2-norbornene wherein the alkylidene group contains from 2-5 carbon atoms. The monomers are polymerized while in solution in an inert solvent in the presence of a Ziegler type catalyst.

The 5-alkylidene-2-norbornene is chemically bound in the interpolymer in an amount to provide an effective unsaturation level of at least 2.0 and preferably at least 5 carbon-to-carbon double bonds per 1,000 carbon atoms in the interpolymer. Higher unsaturated levels can be used up to 50 carbon-to-carbon double bonds to 1,000 carbon atoms but, for the purpose of blending with the SBR rubber to improve green strength without interfering with cure or vulcanization, it is preferred to formulate the EPDM interpolymer for an unsaturation level within the range of 5-25 carbon-to-carbon double bonds per 1,000 carbon atoms in the interpolymer.

As previously described, the monoolefin copolymerized with the ethylene is preferably propylene, in the molar ratio of ethylene to propylene chemically bound in the interpolymer within the range of 70-95 moles of ethylene to 30-5 moles of propylene, and preferably 75-90 moles of ethylene to 25-10 moles of propylene.

The polymerization solvent may be any suitable organic solvent which is liquid and inert under the reaction conditions, and it may be a prior art solvent for solution polymerization of monoolefins in the presence of Ziegler catalysts. Examples of satisfactory hydrocarbon solvents include straight chain paraffins containing 5-8 carbon atoms, of which hexane often gives the best results; aromatic hydrocarbons and especially those containing a single benzene nucleus such as benzene, toluene, etc.; and saturated cyclic hydrocarbons which have boiling ranges approximating those for the straight chain paraffin hydrocarbons and aromatic hydrocarbons discussed above, and especially saturated cyclic hydrocarbons containing 5 or 6 carbon atoms in the ring. The solvent selected may be a mixture of one or more of the foregoing hydrocarbons, such as a mixture of aliphatic and naphthenic hydrocarbon isomers having approximately the same boiling range as normal hexane. It is necessary that the solvent be dry and free of substances which will interfere with the catalyst to be used in the polymerization step.

The catalyst is prepared from a vanadium compound and trialkyl aluminum and/or alkyl aluminum halides wherein the alkyl groups contain 1-20 and preferably 1-4 carbon atoms. Examples of suitable vanadium compounds include vanadium trichloride, vanadium tetrachloride, vanadium oxychloride, vanadium acetylacetonate, etc. Activators which are specially preferred include alkyl aluminum chlorides of the general formulae $R_1AlCl_2$ and $R_2AlCl$, and the corresponding sesquichlorides of the general formula $R_3Al_2Cl_3$, wherein R is a methyl, ethyl, propyl, butyl or isobutyl radical. A catalyst prepared from methyl or ethyl aluminum sesquichloride and vanadium oxychloride is especially preferred, and when using this catalyst, the optimum ratio of the catalyst components is usually 1 mole of vanadium oxychloride for each 4–10 moles of the alkyl aluminum sesquichloride to thereby provide a ratio of aluminum to vanadium of 8:1 to 20:1.

The polymerization is preferably carried out on a continuous basis in a dry prior art reaction vessel closed to the outside atmosphere, which is provided with an agitator, reactor cooling means, and conduit means for continuously supplying the ingredients of the reaction mixture including monomers and catalyst, and conduit means for continuously withdrawing the solution of elastomer. The polymerization is carried out in liquid phase in the organic solvent and in the presence of the Ziegler catalyst. The solution of elastomer in the polymerization solvent is withdrawn continuously from the reaction vessel, the catalyst is killed by addition of a catalyst deactivator such as methanol or water, and the organic solvent is removed. The solvent may be removed by injecting the solution below the liquid level of a body of boiling water maintained in a vessel to which steam is supplied. The resulting polymer crumb is removed as a slurry from the vessel, and the polymerization solvent is withdrawn overhead as a vapor. The polymer crumb may be stripped free of traces of solvent and washed free of catalyst residues, followed by separating water from the crumb by means of a shaker screen or other device, and drying of the crumb by means of a prior art extrusion dryer or apron dryer. The dried crumb is then ready for baling in accordance with prior art practice.

The following example illustrates the manufacture of an EPDM rubber having bound ethylene to propylene in the ratio of 83:17 and actual unsaturation levels of about 5 carbon-to-carbon double bonds per 1,000 carbon atoms.

EXAMPLE 1

The reaction vessel was a one-gallon Sutherland reactor equipped with a high speed, heavy duty, air driven motor; cooling coils; a thermometer; a temperature regulator; a pressure regulator; an injection port; and other openings where monomers, catalyst, and solvent were fed to the reactor. A tube dipping to the bottom of the reactor was present for the removal of the cement produced on a continuous basis. A vapor phase vent was provided to bleed off 15% of the gaseous monomer feed to prevent inert gas buildup.

The clean reactor was assembled, rinsed with dry hexane and purged overnight with dry nitrogen. In the morning the reactor bowl was heated with a flameless blowtorch and hot water was run through the coils until the temperature in the reactor was about 70° C. After this, propylene was flushed through the reactor for about 15 minutes; then the temperature was lowered to ambient and two liters of Esso chemical grade hexane, dried over 4A molecular sieves and stored over sodium, was added to the reactor. As the temperature was brought to 41° C., propylene was fed to the reactor through a 4A molecular sieve column until 19.7 inches Hg pressure was reached. The pressure was then brought up to 30 psi with ethylene fed through a 4A molecular sieve column and approximately 0.12 ml pyridine inhibitor and 2.6 cc of 1.5 M ethylaluminum sesquichloride were added.

The monomers were shut off and the catalysts, 0.165 molar ethylaluminum sesquichloride and 0.005 molar vanadium oxytrichloride at a 40 to 1 aluminum to vanadium ratio, were fed into the reactor at a constant rate until a drop in pressure in the reactor was noted. Also added 0.35 M butyl perchlorocrotonate at 7 to 1 ratio on vanadium. At this time the gaseous monomers were fed into the reactor through suitable calibrated rotometers at a rate of 2864 cc/minute, of which 2224 cc were ethylene and 640 cc were propylene; the termonomer 5-alkylidene-2-norbornene was added as a 0.33 M solution in hexane at 3.28 cc/minute which provided about 4.3 weight percent to be incorporated into the polymer. The polymerization was controlled by the catalyst pumps which added catalyst on demand as the pressure increased, thus maintaining the 30 psi pressure throughout the run. When the solution became approximately 7% polymer, solvent containing 16 cc/cc ethylene was fed at the rate of 51.2 cc/minute into the reactor and the polymer cement taken off which produced about 180 g of polymer per hour.

At this time the ethylene and propylene feeds were adjusted to 1601 cc/minute and 1534 cc/minute to compensate for the unreacted monomers removed with the cement.

The solution cement as removed from the reactor was fed into a Waring Blender containing water where it was intimately mixed. The cement was then washed three times with equal volumes of water. The washed and stabilized cement (1 phr on the rubber of the experimental stabilizer Tergonox 1010 (Geigy) was fed with nitrogen pressure into a tee joint at the bottom of a 4-liter container full of hot circulating water. The other end of the tee is connected to a steam line and steam was admitted at such a rate as to superheat the rubber cement. The solvent and unreacted monomers were mostly removed by this procedure. The rubber crumb was collected on a screen, washed and chopped up in a Waring Blender. The rubber crumb was dried in the oven at 90° C. to remove any remaining solvent and water giving a rubbery copolymer which contained 84 mole percent ethylene analysis, and had a reduced specific viscosity in Decalin at 135° C. of 2.75. The unsaturation expressed in C=C/1000 carbon atoms was 4.8.

EXAMPLE 2

This example illustrates the preparation of an EPDM having a ratio of bound ethylene to propylene of 90:10 with an unsaturation level of about 2 carbon-to-carbon double bonds per 1,000 carbon atoms.

The reaction vessel was a one-gallon Sutherland reactor equipped with a high speed, heavy duty, air driven motor; cooling coils; a thermometer; a temperature regulator; a pressure regulator, an injection port; and other openings where monomers, catalyst, and solvent were fed to the reactor. A tube dipping to the bottom of the reactor was present for the removal of the cement produced on a continuous basis. A vapor phase vent was provided to bleed off 15% of the gaseous monomer feed to prevent inert gas buildup.

The clean reactor was assembled, rinsed with dry hexane and purged overnight with dry nitrogen. In the morning the reactor bowl was heated with a flameless blowtorch and hot water was run through the coils until the temperature in the reactor was about 70° C. After this, propylene was flushed through the reactor for about 15 minutes; then the temperature was lowered to ambient and two liters of Esso chemical grade hexane, dried over 4A molecular sieves and stored over sodium, was added to the reactor. As the temperature was brought to 60° C., propylene was fed to the reactor through a 4A molecular sieve column until 19.2 inches Hg pressure was reached. The pressure was then brought up to 30 psi with ethylene fed through a 4A molecular sieve column and approximately 0.12 ml pyridine inhibitor and 2.6 cc of 1.5 M ethylaluminum sesquichloride were added.

The monomers were shut off and the catalysts, 0.30 molar ethylaluminum sesquichloride and 0.009 molar vanadium oxytrichloride at a 40 to 1 aluminum to vanadium ratio, were fed into the reactor at a constant rate until a drop in pressure in the reactor was noted. Also added 0.063 M butyl perchlorocrotonate at 7 to 1 vanadium. At this time the gaseous monomers were fed into the reactor through suitably calibrated rotometers at a rate of 2139 cc/minute, of which 1780 cc were ethylene and 359 cc were propylene; the termonomer ethylidene norbornene was added as a 0.09 M solution in hexane at 3.27 cc/minute which provided about 1.71 weight percent to be incorporated into the polymer. The polymerization was controlled by the catalyst pumps which added catalyst on demand as the pressure increased, thus maintaining the 30 psi pressure throughout the run. When the solution became approximately 5% polymer solvent containing 16 cc/cc ethylene was fed at the rate of 51.0 cc/minute into the reactor and the polymer cement taken off which produced about 123 g of polymer per hour.

At this time the ethylene and propylene feeds were adjusted to 1113 cc/minute and 792 cc/minute to compensate for the unreacted monomers removed with the cement.

The solution cement as removed from the reactor was fed into a Waring Blender containing water where it was intimately mixed. The cement was then washed three times with equal volumes of water. The washed and stabilized cement (1 phr on the rubber of the experimental stabilizer Tergonox 1010) was fed with nitrogen pressure into a tee joint at the bottom of a 4-liter container full of hot circulating water. The other end of the tee is connected to a steam line and steam was admitted at such a rate as to superheat the rubber cement. The solvent and unreacted monomers were mostly removed by this procedure. The rubber crumb was collected on a screen, washed and chopped up in a Waring Blender. The rubber crumb was dried in the oven at 90° C. to remove any remaining solvent and water giving a rubbery polymer which contained 90.4 mole percent ethylene by infra-red analysis, and had a reduced specific viscosity in Decalin at 135° C. of 2.26. The actual unsaturation expressed in $C=C/1000$ carbon atoms was 1.7.

EXAMPLES 3 TO 8

Examples 3 to 8 illustrate blends compounded of SBR rubber, polybutadiene rubber, with EPDM rubber of example 1, in amounts ranging from 0–50 parts by weight of the EPDM rubber to 100–50 parts by weight of the polybutadiene-SBR, with the amount of SBR diminishing inversely to the increase in EPDM rubber, as set forth in the following table in which the values are in parts by weight:

TABLE I

| INGREDIENTS | Ex. 3 | Ex. 4 | Ex. 5 | Ex. 6 | Ex. 7 | Ex. 8 |
|---|---|---|---|---|---|---|
| Polybutadiene Rubber (Phillips 1203, Phillips Petroleum Co.) | 20 | 20 | 20 | 20 | 20 | 20 |
| SBR Rubber (COPO 1502, Copolymer Rubber & Chemical) | 20 | 20 | 20 | 20 | 20 | |
| SBR Rubber (COPO 1778, Copolymer Rubber & Chemical) | 82.5 | 69 | 55 | 41.25 | 13.75 | 82.5 |
| EPDM (example 1) | 0 | 10 | 20 | 30 | 50 | 20 |
| Carbon Black (N-330 Carbon Black 100%) | 50 | 50 | 50 | 50 | 50 | 50 |
| Naphthenic Oil (Circosol 4240, Sun Oil Co.) | 15 | 15 | 15 | 15 | 15 | 15 |
| Alkyl Phenol Formaldehyde Tackifier Resin (SP1077 Schenectady Chemical) | 3 | 3 | 3 | 3 | 3 | 3 |
| Zinc Oxide | 5 | 5 | 5 | 5 | 5 | 5 |
| Stearic Acid | 1 | 1 | 1 | 1 | 1 | 1 |
| N-t,butyl-2-Benzothiazole Sulfonamide (Santocure NS, Monsanto Chemical) | 1 | 1 | 1 | 1 | 1 | 1 |
| Tetramethyl Thiuram Monosulfide-Accelerator (Unads, R. T. Vanderbilt) | 0.1 | 0.1 | 0.1 | 0.1 | 0.1 | 0.1 |
| Sulfur | 2.5 | 2.5 | 2.5 | 2.5 | 2.5 | 2.5 |
| Octamine | 1 | 1 | 1 | 1 | 1 | 1 |

In compounding the compositions of examples 3–8, the elastomeric components are blended on a cool roller mill for 2 minutes before the other ingredients are added for admixture into the blend by way of the rolling mill.

Standard green strength elongation-modulus tests were run on each of the compounds charted, using a cross head speed of 20 inches/minute and a chart speed of 10 inches per minute. Full scale load was varied from 10 to 50 pounds. Sample size was 1 inch wide and approximately 0.080 inches in thickness. The results are summarized in the following Table II.

TABLE II

| MODULUS OF UNCURED COMPOUNDS | | | | | |
|---|---|---|---|---|---|
| | Ex. 3 | Ex. 4 | Ex. 5 | Ex. 6 | Ex. 7 |
| Modulus at 50% Elongation, psi | 31.8 | 37.8 | 49.5 | 64.2 | 108 |
| Modulus at 100% Elongation, psi | 31.4 | 37.6 | 49.2 | 66.2 | 114 |
| Modulus at 200% Elongation, psi | 26 | 34.1 | 47.0 | 68.3 | 128 |
| Modulus at 300% Elongation, psi | 22.1 | 32.3 | 49.5 | 75.0 | 150 |
| Modulus at 400% Elongation, psi | — | 30.0 | 46.9 | 83.3 | 170 |
| Modulus at 500% Elongation, psi | — | 26.9 | 51.3 | 93.0 | 202 |
| Modulus at 600% Elongation, psi | — | — | 51.8 | 105 | 246 |
| ΔM, 300% Modulus - 200% Modulus, psi | −3.9 | −1.8 | +2.5 | +6.7 | +22 |

TABLE II-continued

| MODULUS OF UNCURED COMPOUNDS | | | | | |
|---|---|---|---|---|---|
| | Ex. 3 | Ex. 4 | Ex. 5 | Ex. 6 | Ex. 7 |
| Elongation at break | <400% | <600 | >600 | >700 | >600 |

It will be seen that the stretching load decreases only slightly and gradually in the compound of example 4 (10% EPDM) but that the load increases up to 600% elongation in the compounds of examples 5–7 (20–50% EPDM). This is indicative of uniform stretching without rupture or necking through the 200–300% elongation up to as much as 600% elongation.

The following Table III gives the physical properties of the compounds and of the cured blends for cure times of 15, 20 and 30 minutes at 302° F.

TABLE III

| | | Ex. 3 | Ex. 4 | Ex. 5 | Ex. 6 | Ex. 7 |
|---|---|---|---|---|---|---|
| Compound ML 1 + 4 (212° F.) | | 41 | 45 | 48 | 53 | 70 |
| Mooney Scorch (MS @ 270° F.) | | | | | | |
| Minutes to 5 Pt. Rise | | 23.5 | 21.9 | 20.6 | 19.5 | 17.0 |
| Minimum Reading | | 17 | 17 | 20 | 23 | 30 |
| | Press Cure @ 302° F. | | | | | |
| Tensile, psi | 15' | 1775 | 2225 | 2200 | 2250 | 2225 |
| | 20' | 1575 | 1925 | 1800 | 2151 | 2175 |
| | 30' | 1550 | 2000 | 1875 | 2050 | 2325 |
| Elongation, % | | 500 | 590 | 540 | 480 | 500 |
| | | 500 | 490 | 420 | 430 | 410 |
| | | 450 | 430 | 400 | 380 | 400 |
| 300% Modulus, psi | | 625 | 725 | 925 | 1225 | 1375 |
| | | 700 | 950 | 1125 | 1350 | 1700 |
| | | 825 | 1100 | 1250 | 1500 | 1725 |
| Hardness, Shore A | | 51 | 53 | 55 | 60 | 69 |
| | | 51 | 54 | 57 | 62 | 70 |
| | | 53 | 56 | 59 | 63 | 71 |
| Compression Set, % | | | | | | |
| 22 hrs. @ 158° F. | 30' | 26.6 | 23.8 | 25.2 | 25.2 | 26.5 |
| Goodrich ΔT, °F. | 40' | 54 | 49 | 56 | 64 | 73 |

It is believed that the contribution of EPDM to green strength for elongation is derived from the high crystalline phase of the EPDM interpolymer wherein the crystals act a fibers in the blend to hold the mass together and prevent separation leading to necking or rupture, and to provide for a more uniform spread of the rubber compound and reinforcing fibers during stretching. Based upon this theory as distinguished from the theory that the described improvements result from a tie-in with the SBR through the unsaturated groupings in both the SBR and EPDM, there is reason to believe that corresponding improvements in green strength of the SBR rubbers can be achieved by blending the SBR with EPM polymers in which the ethylene-propylene molar ratio is greater than 80/20 and preferably within the range of 82/95 mole percent ethylene to 18–5 mole percent propylene to provide for a high degree of crystallinity in the polymer.

While the invention has been described with reference to the improvement in green strength of SBR rubbers and SBR rubber blends, it has been found that improvement in green strength can be achieved when the described high crystallinity EPDM and EPM polymers are admixed with other rubbers such as natural rubber, and other synthetic rubbers including conjugated diolefin rubbery polymers based upon $C_4$–$C_6$ diolefins, such as polybutadiene, polyisoprene, polychloroprene rubbers and rubbery polymers of conjugated diolefins, such as butadiene, 1,3-isoprene, piperylene and 2,3-dimethyl butadiene with unsaturated monomers as the vinyl toluenes or with acrylonitrile (NBR) and methacrylonitrile, alone or blended with polyisobutylene.

While use can be made of EPDM interpolymer in which the polyene component is a polyunsaturated breached ring hydrocarbon or a polyene such as 1,4-hexadiene or dicyclopentadiene, it is preferred to make use of an alkylidene-2-norbornene as the third monomer because of the activity during cure or vulcanization which enables the formed EPDM component to compete with the polybutadiene and the SBR in the cure or vulcanization process whereby the desired cure and vulcanization rate can be maintained while achieving tie-in of the EPDM interpolymer with the SBR and the polybutadiene in the cured or vulcanized rubber product.

It will be understood that changes may be made in the details of formulation and ingredients without departing from the spirit of the invention, especially as defined in the following claims.

I claim:

1. A method of producing an SBR based rubber characterized by high green strength and elongation in the uncured stage comprising blending the SBR based rubber is selected from the group consisting of styrene-butadiene rubber and blends of styrene-butadiene rubber with polybutadiene rubber, polyisoprene rubber or natural rubber with a polymer having a high degree of crystallinity selected from the group consisting of an EPM polymer formed by the interpolymerization of ethylene and one or more $C_3$–$C_{16}$ monoolefins and an EPDM interpolymer formed by interpolymerization of ethylene, one or more $C_3$–$C_{16}$ monoolefins and a polyene in the ratio of 50–95 parts by weight of SBR based rubber per 50–5 parts by weight of the EPM or EPDM, in which the ratio of ethylene and monoolefin bound in the polymer is within the range of more than 80 mole percent ethylene to less than 20 percent $C_3$–$C_{16}$ monoolefin.

2. A method as claimed in claim 1 in which the ratio of ethylene to the $C_3$–$C_{16}$ monoolefin in the polymer is within the range of 82–95 mole percent ethylene to 18–5 mole percent $C_3$–$C_{16}$ monoolefin.

3. A method as claimed in claim 1 in which the $C_3$–$C_{16}$ monoolefin is propylene.

4. A method as claimed in claim 1 in which the polyene is a polyunsaturated bridged ring hydrocarbon.

5. A method as claimed in claim 4 in which the polyunsaturated bridged ring hydrocarbon is a 5-alkylidene-2-norbornene in which the alkylidene group has from 2–5 carbon atoms.

6. A method as claimed in claim 1 in which the polyene is present in the interpolymer in an amount to provide at least 2 carbon-to-carbon double bonds per 1,000 carbon atoms.

7. A rubber compound having good green strength and elongation in the uncured stage comprising a blend of an SBR based rubber is selected from the group consisting of styrene-butadiene rubber and blends of the sytrene-butadiene rubber with polybutadiene rubber, polyisoprene rubber or natural rubber polymer with an EPM polymer having a high degree of crystallinity formed by interpolymerization of ethylene and one or more $C_3$–$C_{16}$ monoolefins or an EPDM interpolymer formed by interpolymerization of ethylene, one or more $C_3$–$C_{16}$ monoolefins and a polyene in the ratio of 50–95 parts by weight of the rubbery polymer per 50–5 parts by weight of the EPM or EPDM, in which the ratio of ethylene to $C_3$–$C_{16}$ monoolefin in the EPM and EPDM is within the range of more than 80 mole percent ethylene to less than 20 mole percent $C_3$–$C_{16}$ monoolefin.

8. A compound as claimed in claim 7 in which the mole ratio of ethylene to the $C_3$–$C_{16}$ monoolefin in the EPM and EPDM is within the range of 82–95% ethylene to 18–5% $C_3$–$C_{16}$ monoolefin.

9. A compound as claimed in claim 8 in which the $C_3$–$C_{16}$ monoolefin is propylene.

10. A compound as claimed in claim 7 in which the compound is blended with an EPDM interpolymer in which the polyene is a polyunsaturated bridged ring hydrocarbon.

11. A compound as claimed in claim 10 in which the polyene is 5-alkylidene-2-norbornene in which the alkylidene has from 2 to 5 carbon atoms.

12. A compound as claimed in claim 11 in which the polyene is 5-ethylidene-2-norbornene.

13. A compound as claimed in claim 7 in which the polyene is present in an amount to provide at least 2 carbon-to-carbon double bonds per 1,000 carbon atoms in the polymer.

14. A compound as claimed in claim 7 in which the material blended is an EPDM formed by the copolymerization of ethylene, propylene and 5-alkylidene-2-norbornene in which the alkylidene group has from 2 to 5 carbon atoms and in which the mole ratio of ethylene to propylene is within the range of 82–95% ethylene to 18–5% propylene.

* * * * *